(No Model.) 2 Sheets—Sheet 2.
H. HASSENPFLUG.
VEGETABLE SLICER.
No. 318,560. Patented May 26, 1885.
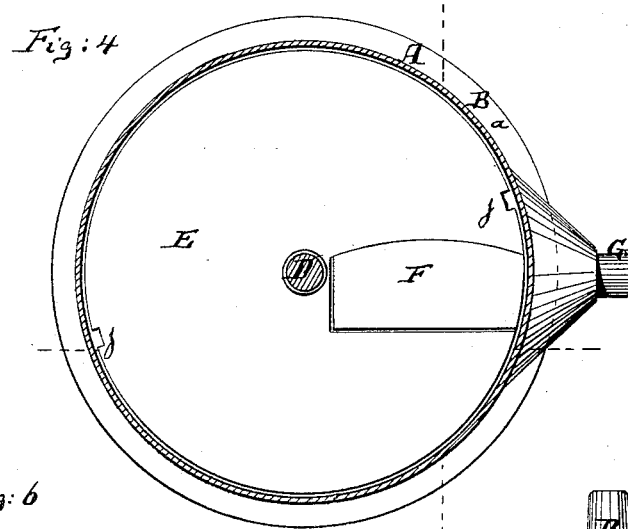
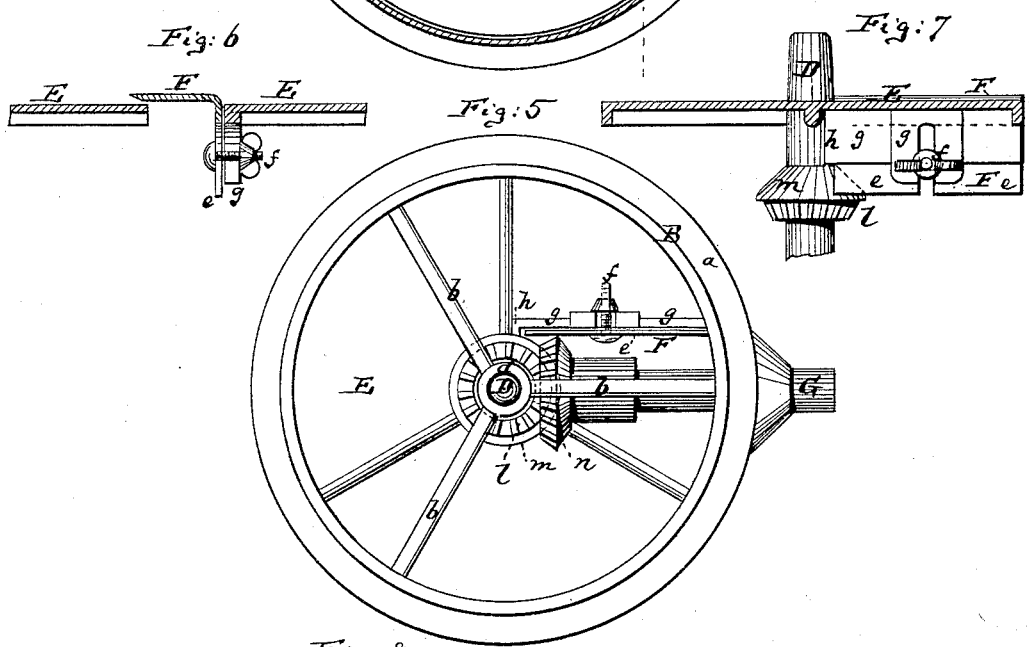
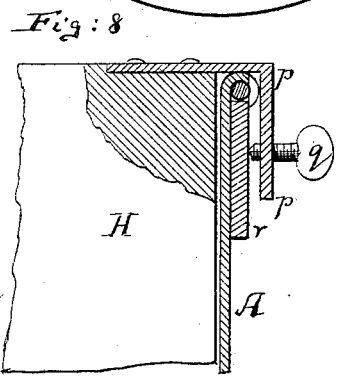
Witnesses:
John C. Tunbridge
John M. Speer
Inventor:
Henry Hassenpflug
by his Attorneys
Briesen & Steele

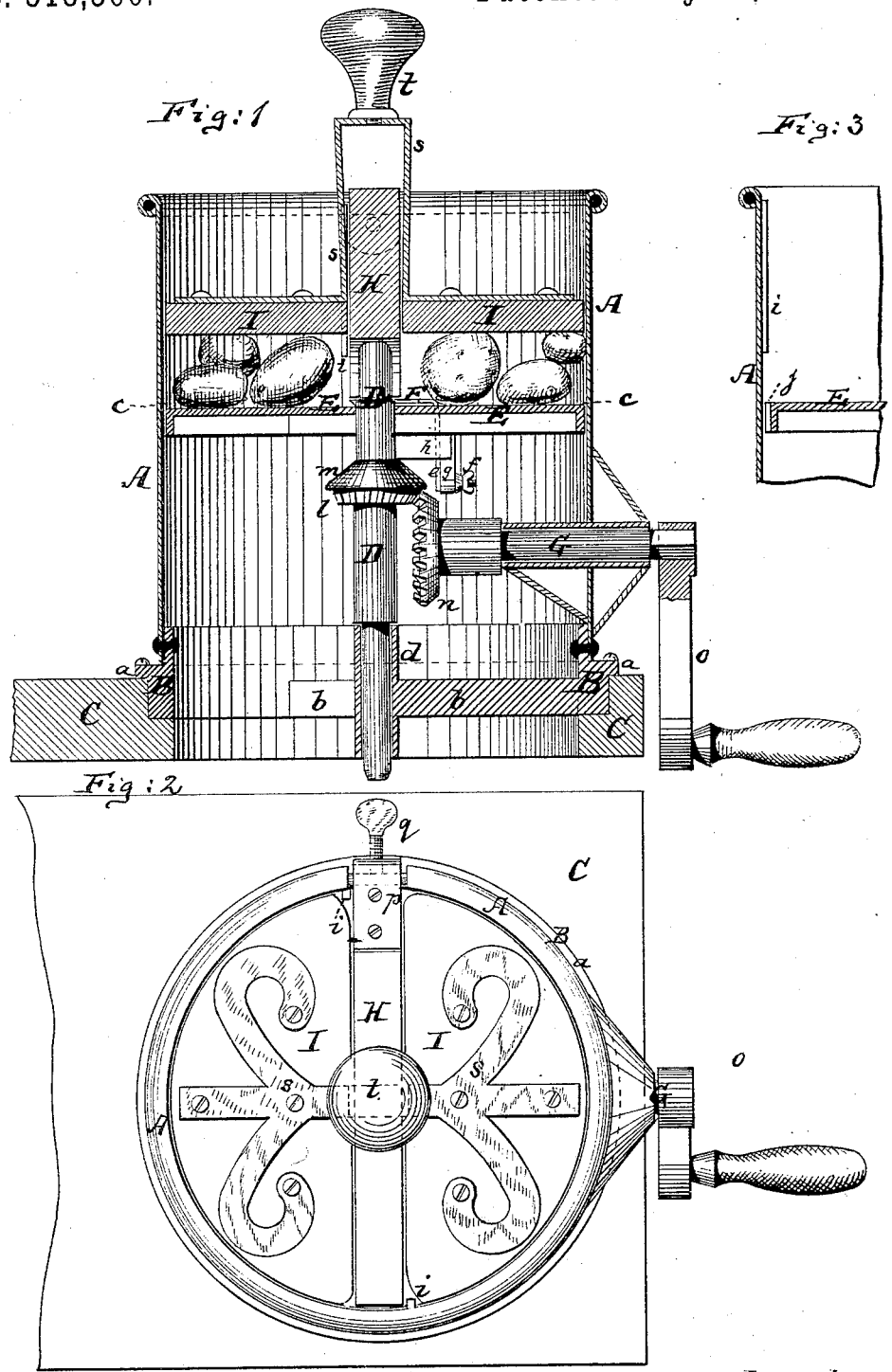

UNITED STATES PATENT OFFICE.

HENRY HASSENPFLUG, OF HUNTINGDON, PENNSYLVANIA.

VEGETABLE-SLICER.

SPECIFICATION forming part of Letters Patent No. 318,560, dated May 26, 1885.

Application filed October 27, 1884. (No model.)

*To all whom it may concern:*

Be it known that I, HENRY HASSENPFLUG, a resident of Huntingdon, in the county of Huntingdon and State of Pennsylvania, have invented an Improved Vegetable-Slicer, of which the following is a full, clear, and exact description, reference being made to the accompanying drawings, in which—

Figure 1 is a sectional elevation of my improved vegetable-slicer. Fig. 2 is a plan or top view of the same. Fig. 3 is a detail vertical section through one wall of the cylinder, showing one of the ribs which is attached to the same. Fig. 4 is a horizontal section on the line $c$ $c$, Fig. 1. Fig. 5 is a bottom view of the same; and Figs. 6, 7, and 8 are detail views, hereinafter more fully referred to.

The object of this invention is to produce a machine in which vegetables and other substances can be conveniently and rapidly sliced.

The invention consists of the new combination of parts that are hereinafter more fully specified.

In the drawings, the letter A represents an upright cylinder, riveted or otherwise secured at its lower end to a cast or other ring, B, which is flanged at $a$, so that it can be set into an aperture formed in a supporting bench or table, C. The ring B has inner braces, $b$, which carry the tubular support $d$ of the central upright shaft, D, which central upright shaft is concentric within the cylinder A when sustained in the tube $d$, as shown in Fig. 1. Upon the upper portion of the shaft D is mounted a disk, E, which fits well within the cylinder C, and which carries one or more slicing-knives, F. Each slicing-knife F (see Figs. 6 and 7) is L-shaped in cross-section, and has its vertical shank $e$ attached by a set-screw, $f$, to a downwardly-projecting flange, $g$, of the disk E. The shank $e$ of the knife F projects through a slot or aperture of the disk E, as shown. It follows that by means of the set-screw $f$, which passes through a slot in the flange $g$, as shown in Fig. 7, the knife F can be readily adjusted up or down to cut thicker or thinner slices. The inner end of the shank $e$ of the knife bears against a lateral extension or shoulder, $h$, of the flange $g$, as shown in Fig. 5, so that thereby motion of the knife in the direction of its length is prevented.

The disk E, which carries the knife or knives F, being, as already stated, firmly mounted upon the shaft D, I will now describe how the same is inserted in the cylinder A. The cylinder has on its inner side two or more upright ribs, $i$. (See Figs. 2 and 3.) To correspond with these ribs, the disk E has along its periphery an equal number of notches $j$. (See Fig. 4.) When the disk E is so placed that these notches are in line with the said ribs, the disk, with the shaft thereon, can be removed from the cylinder and reinserted, and is afterward turned to bring the notches out of line with the ribs. The shaft D carries below the disk E a beveled gear-wheel, $l$, which is covered by a conical cap, $m$, and which gears with a beveled wheel, $n$, that is mounted upon the driving-shaft G, which has its bearings in the lower part of the cylinder A, and which carries a suitable crank-handle, $o$. The cap $m$ prevents the slices that are cut from being crushed between the gear-wheels. After the parts already described have been put in proper relative position a transverse partition, H, is placed in the upper part of the cylinder above the disk E. This partition divides the upper part of the cylinder into two chambers, and forms abutting surfaces, against which the articles to be sliced are held during the act of slicing. The partition H is held in place and prevented from turning within the cylinder by being leaned against the ribs $i$ in manner shown in Fig. 2, and it is prevented from vertical displacement by means of a clamp, $pq$, which joins it to the cylinder, as shown in Fig. 8—that is to say, the partition H has a projecting angle-iron, $p$, which passes over the edge of the cylinder, and in this angle-iron, outside of the cylinder, a set-screw, $q$, which, when turned against the outer wall of the cylinder, will clamp the partition tight. For the purpose of giving this set-screw a firm hold, a plate, $r$, is at this place fastened by solder or otherwise to the outer wall of the cylinder A.

The follower I, which is to bear upon the articles to be sliced, is composed of two boards that are adapted to enter the chambers of the cylinder on each side of the partition H, and that are united by a metallic strap, $s$, which straddles said partition, as shown in Fig. 1, and which has a handle, $t$.

The operation is as follows: After the partition H has been put in position the fruit or other substance to be sliced is placed upon the disk E on each side of the partition, or on one side only, if desired. The follower I is then put in position so that it bears upon said fruit or other substance. The shaft G is now revolved, one hand of the attendant bearing upon the handle $t$ to cause the follower to press the fruit with sufficient force upon the disk, and during the revolution of the disk the slices will be cut off the fruit or other substance, and, falling through the opening or openings in the disk, may enter a tub placed for their reception below these apertures.

Instead of pressing upon the follower I, the latter may be loaded or weighted, which would answer the same purpose.

I claim—

1. The combination, in a vegetable-slicer, of the disk E, having downwardly-extending vertically-slotted flange $g$, with the L-shaped knife F and screw $f$, said screw being parallel with the cutting-blade of the knife, substantially as described.

2. The combination, in a vegetable-slicer, of the disk E, having downwardly-projecting slotted flange $g$, and lateral extension $h$ thereon, with the L-shaped knife F and screw $f$, substantially as herein shown and described.

3. The combination of the cylinder A, flanged ring B, shaft D, toothed wheel $l$, and conical cap $m$ thereon, with the disk E, having L-shaped knife or knives F, and with the shaft G, having gear-wheel $n$, substantially as described.

4. The cylinder A, having ribs $i$, combined with the partition H, having clamp $pq$, and with the follower I and cutter-disk E, as specified.

5. The follower I, made in two parts which are connected by the strap $s$, in combination with the partition H, cylinder A, and cutter-disk E, substantially as herein shown and described.

HENRY HASSENPFLUG.

Witnesses:
J. M. IRWIN,
I. W. SHOWALTER.